United States Patent
Linke et al.

[11] 4,060,312
[45] Nov. 29, 1977

[54] COPIER LENS OF REFLEX DESIGN

[75] Inventors: Walter R. Linke, Chicago; Andor A. Fleischman, Northbrook, both of Ill.

[73] Assignee: Bell & Howell Company, Chicago, Ill.

[21] Appl. No.: 720,482

[22] Filed: Sept. 3, 1976

[51] Int. Cl.$^2$ .......................... G02B 3/04; G02B 17/08
[52] U.S. Cl. ............................ 350/189; 350/175 NG; 350/202
[58] Field of Search .................. 350/202, 175 NG, 189

[56] References Cited
U.S. PATENT DOCUMENTS 3,659,922  5/1972  McCrobie ............................ 350/202

FOREIGN PATENT DOCUMENTS 2,500,070  10/1975  Germany .............................. 350/202
1,008,952  11/1965  United Kingdom .................. 350/202

*Primary Examiner*—Paul A. Sacher
*Attorney, Agent, or Firm*—John E. Peele, Jr.; Roger M. Fitz-Gerald

[57] ABSTRACT

A lens system primarily for a copier is a reflex, plastic and glass lens design enabling lower manufacturing costs with a higher degree of optical correction than a comparable all glass straight through design of similar optical characteristics. In the preferred embodiment, selected of the plastic elements is formed with aspheric surfaces.

1 Claim, 10 Drawing Figures

COPIER LENS OF REFLEX DESIGN

This invention relates to a lens system for a copier in which original material is optically copied, essentially at a one-to-one ratio, onto sensitized copy material, such as electrostatically-treated paper. More particularly, the lens system relates to a reflex glass and plastic lens design in which the image of the original passes through the lens and is reflected by an internal mirrored surface to again pass through the lens system to the copy material. This lens design with selected of the elements having aspheric surfaces, enables obtaining a high degree of optical correction with a lower manufacturing cost than a comparable non-reflex optical system of similar design characteristics.

Document copiers have become more popular and the field more competitive with the increased popularity. To reamin competitive, lower cost components are desirable while maintaining or improving performance. Optical components such as the copier lens system, must of necessity be of high quality and high performance. To reach these goals in the past, complex lens systems having 8 to 10 spherical glass elements have been used. Since grinding and polishing of glass is inherently expensive, the large number of elements cause the resulting lens system to be relatively expensive.

To reduce the cost of the lens system, a lens design is proposed having fewer elements than would normally be expected to be required to obtain the necessary degree of optical correction. By passing light rays twice through the lens elements, by reflection, the number of elements is reduced, and the physical dimensions of te copier may be altered if not reduced. Further, by molding selected of the elements of plastic, comparable, if not better optical corrections can be obtained with fewer elements than would be required for glass spherical lens designs. Hence, a lower cost, high performance copier lens system of reflex configuration has been designed.

An object of the invention is to provide a relatively low cost copier lens of plastic and glass in a reflex design.

The above and other objects of the invention will become apparent by reference to the detailed description, when taken in conjunction with the accompanying drawings.

In the drawings

Figure 1:
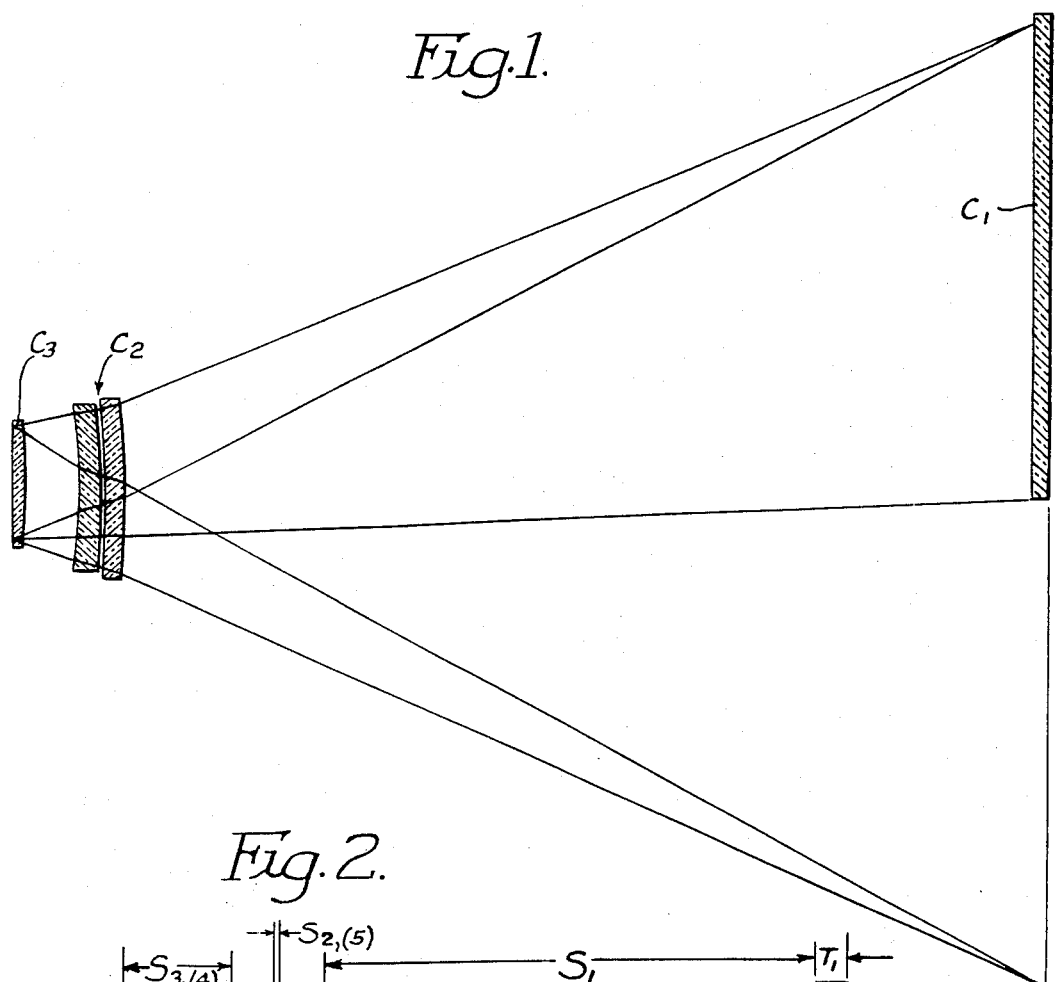
FIG. 1 is a diagrammatic view of a preferred form of the optical system, approximating positioning of the elements.

With reference to FIG. 1 of the drawings, the preferred form of a copier lens system is shown. The original material to be copied is arranged, as shown, to the right of component $C_1$, a cover plate. The light rays from the original transmit the image to a component $C_2$, the copier objective. After the light rays pass from right to left through elements of the component $C_2$, the rays engage a rearward element surface of a reflector component $C_3$ and are reflected back through the elements of the component $C_2$. The light rays image the copy on an image plane essentially parallel with the plane in which the original is located.

Figure 2:
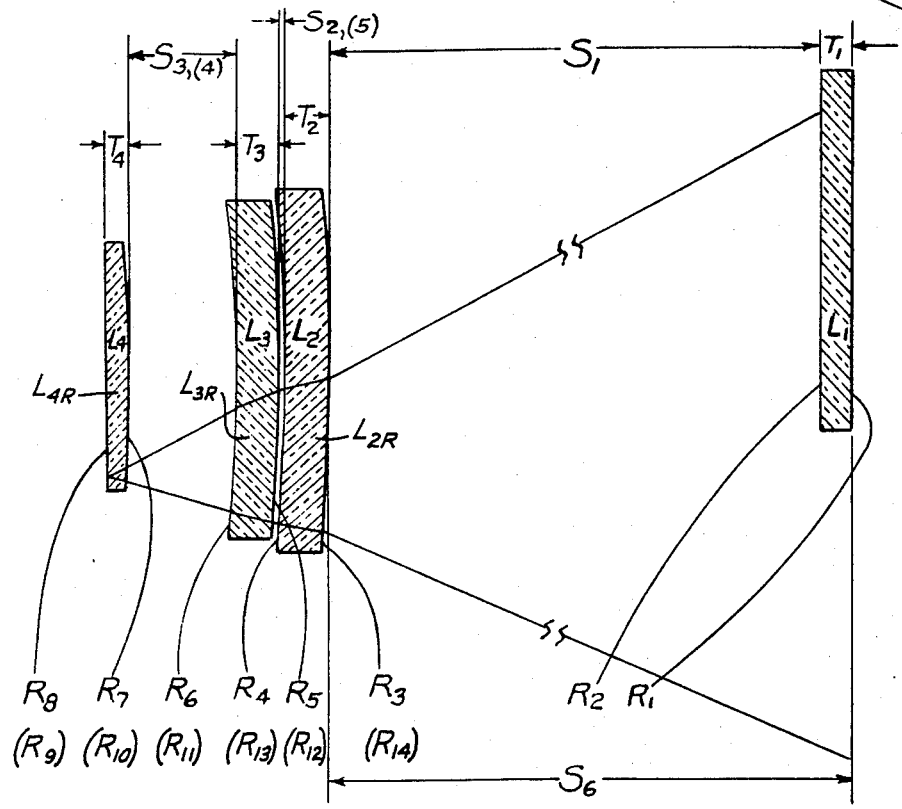
FIG. 2 is a similar diagrammatic view with the elements enlarged for clarity.

In FIG. 2, the preferred embodiment of the copier lens system having the cover plate $L_1$, and three active elements $L_2$, $L_3$, and $L_4$, is shown. The planar cover plate $L_1$ is of optical material, such as glass. Adjacent to or against the exterior surface of the plate, the original document is positioned to be copied. The light rays forming the image of the document pass to and through the component $C_2$, formed as a doublet of elements $L_2$ and $L_3$, and to the third component $C_3$, a mirror element $L_4$. The light rays are reflected by the remote surface of the mirror element to reflect the image back through the elements and onto a not shown sensitive material at the image plane.

Element $L_2$ is a weak negative meniscus type lens element with both surfaces of spherical section, which lens defines a part of the image forming component $C_2$.

The second element $L_3$ of the doublet component $C_2$ is molded of a plastic material, such as polymethylmethacrylate, and can be more readily configured with aspheric surfaces than a similar glass element. The aspheric surfaces of the element correct optical distortions, such as coma, to a greater degree than can most single spherical elements. The plastic element thus enables the lens system to be lighter in weight than an all glass system of similar optical characteristics having a comparable degree of optical correction. Therefore, the resulting lens system is of lighter weight and of lower manufacturing cost since a comparable spherical glass design probably would likely require at least another element to obtain comparable correction of optical aberrations.

The third active element $L_4$ is a reflector element combining the functions of correcting the image, and reflecting the light rays to again pass these rays through the aforedescribed optical elements. Upon exit of the light rays from element $L_3$, the rays continue inwardly of the lens system until the rays have passed through the forward surface of the reflector and engage the reflective rearward surface of element $L_4$. Since the light rays pass reversely through the elements, selected optical distortions are canceled or at least reduced, due to the re-refraction by the same elements. Nevertheless, the mirror reflecting surface $R_8$ is a spherical surface to the rear or original remote side of element $L_4$. Thus, the element serves to doubly correct the image as well as to reflect the image to the air spaced doublet composed of elements $L_2$ and $L_3$.

As the light passes a second time through the doublet, the elements $L_2$ and $L_3$ reverse the effect above described for coma, distortion, and lateral color aberrations, and are additive for most other aberrations.

The optical values of the optical system of FIG. 2 are as follows:

EFL = 7.4388 inches (188.94mm)
Half Angle of Field = 25.92 degrees
Aperture = f/5.02 (All dimensions in Inches)

| Lens | Radii | Thickness | Spacing | $N_D$ | V |
|---|---|---|---|---|---|
| $L_1$ | $R_1$ = INF. | $T_1$ = .2350 | | 1.522 | 59.5 |
| | $R_2$ = INF. | | $S_1$ = .0100 | | |
| $L_2$ | $R_3$ = +13.3610 | $T_2$ = .3090 | | 1.755 | 27.6 |
| | $R_4$ = − 8.0685 | | $S_2$ = .0230 | | |
| $L_3$ | *$R_5$ = + 4.10036 | $T_3$ = .3240 | | 1.490 | 57.4 |
| | *$R_6$ = − 4.01434 | | | | |

-continued

| Lens | Radii | Thickness | Spacing | $N_D$ | V |
|---|---|---|---|---|---|
| | | | $S_3 = .8560$ | | |
| $L_4$ | $R_7 = +9.4050$ | $T_4 = .1660$ | | 1.589 | 61.3 |
| | $R_8 = +39.1650$ | | | | |
| $L_{4R}$ | $R_9 = +39.1650$ | $T_5 = .1660$ | | 1.589 | 61.3 |
| | $R_{10} = +9.4050$ | | | | |
| | | | $S_4 = .8560$ | | |
| $L_{3R}$ | $*R_{11} = -4.01434$ | $T_6 = .3240$ | | 1.490 | 57.4 |
| | $*R_{12} = +4.10036$ | | | | |
| | | | $S_5 = .0230$ | | |
| $L_{2R}$ | $R_{13} = -8.0685$ | $T_7 = .3090$ | | 1.755 | 27.6 |
| | $R_{14} = +13.3610$ | | | | |
| | | | $S_6 = 13.5345$ | | |

In the above table, the first column lists the lens elements numerically with the subscript "R" added to indicate the retrace elements in which the light rays pass a second time. The elements are listed starting at the ray entrance side of the system. The second column lists the respective radii and the vertex radii of the aspheric surfaces $*R_5$, $*R_6$, $*R_{11}$, and $*R_{12}$. The positive and negative signs given the respective radii follow the "lensmaker's convention", to facilitate fabrication of the individual lens elements, wherein convex surfaces are positive and concave surfaces are negative. The aspheric surfaces are determined by the formula:

$$Z_1 = (K(H^2 - Z_0^2) + 2 \cdot (AH^4 + BH^6 + CH^8 + DH^{10}))/(2(1 - KZ_0))$$

In the formula, constants are:

| ASPHERIC RADIUS | K | A | B | C |
|---|---|---|---|---|
| $*R_5$ | 4.10036 | 0.24388 | $-4.33743 \times 10^{-2}$ | $-6.69880 \times 10^{-3}$ | $3.35489 \times 10^{-3}$ |
| $*R_6$ | -4.01434 | -0.24911 | $4.39092 \times 10^{-2}$ | $5.13433 \times 10^{-3}$ | $-4.17914 \times 10^{-3}$ |
| $*R_{11}$ | 4.01434 | 0.24911 | $-4.39092 \times 10^{-2}$ | $-5.13433 \times 10^{-3}$ | $4.17914 \times 10^{-3}$ |
| $*R_{12}$ | -4.10036 | -0.24388 | $4.33743 \times 10^{-2}$ | $6.69880 \times 10^{-3}$ | $-3.35489 \times 10^{-3}$ | where H is the Cartesian coordinate of a point on the surface referred in a vertical axis; and Z is the coordinate of a point on the surface referred in a horizontal axis. The third column lists the thickness of the respective elements and the nominal image plane. The fourth column lists the axial spacings (in inches) between the respective elements, and the image plane at which the light rays are imaged. The fifth and sixth columns list respectively the refractive indes $N_D$ and the dispersion index V.

FIGS. 3a to 3h graphically represent various aberrations related to the form of the optical system as shown schematically in FIGS. 1 and 2, and having the design data recited in the table.

Figure 3A:
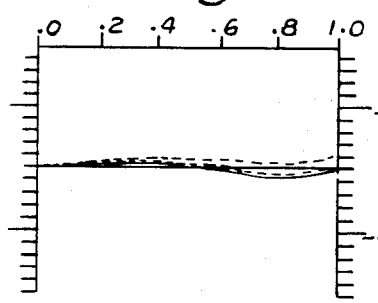
FIGS. 3a to 3h are graphical representations of the various aberrations of the lens system shown in FIG. 2, and having the design data given in the table, hereinafter.
Figure 3B:
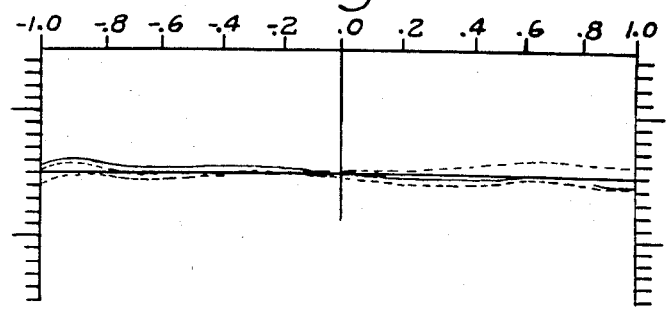
Figure 3C:
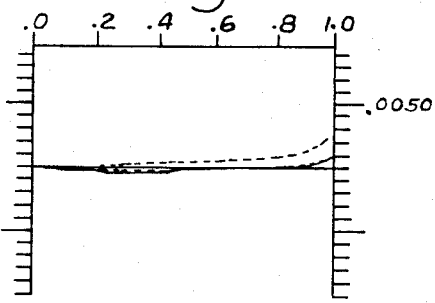
Figure 3D:
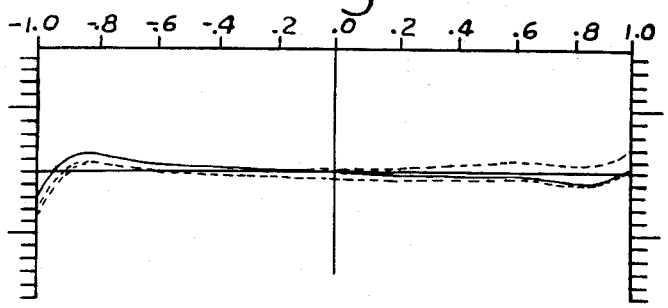
Figure 3E:
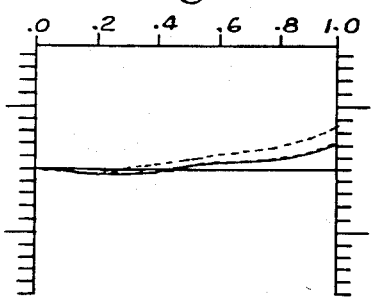
Figure 3F:
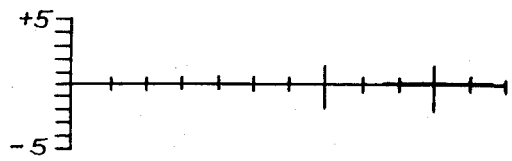
Figure 3G:
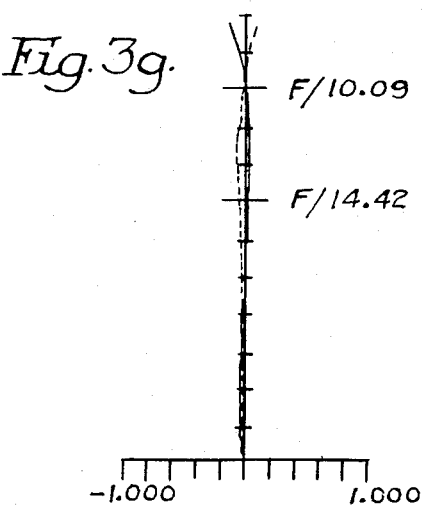
Figure 3H:
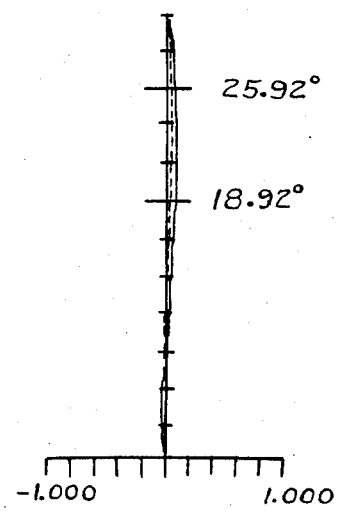

FIG. 3a represents axial chromatic correction of three typical wavelength forming rays on axis and lateral. FIG. 3b represents off axis aberrations of rays passing from the zone of the image format and through the lens transversely and tangentially. FIG. 3c represents the aberrations of the rays passing from the corner of the image format through the lens tangentially and transversely. FIG. 3d represents the radial or longitudinal aberration from the zone of the image format of rays entering the lens at 3 o'clock, while FIG. 3e represents similar aberrations from full field or corner rays. FIG. 3f represents distortion as a percentage of a "perfect" image. FIG. 3g represents the spherical aberration by a full line and the offense-against-sine-condition by the dotted line. FIG. 3h represents the curvature of field with the tangential curvature being shown in full line and the sagittal curvature being shown in dashed lines.

What I claim is:

1. An optical system of a reflex copier lens including a combination of glass and plastic elements, at least one of the elements being plastic and having aspheric surfaces, the system having substantially the following specifications:

EFL = 7.4388 inches (188.94mm)
Half Angle of Field = 25.92 degrees
Aperture = f/5.02 (All dimensions in Inches)

| Lens | Radii | Thickness | Spacing | $N_D$ | V |
|---|---|---|---|---|---|
| $L_1$ | $R_1 =$ INF. | $T_1 = .2350$ | | 1.522 | 59.5 |
| | $R_2 =$ INF. | | | | |
| | | | $S_1 = .0100$ | | |
| $L_2$ | $R_3 = +13.3610$ | $T_2 = .3090$ | | 1.755 | 27.6 |
| | $R_4 = -8.0685$ | | | | |
| | | | $S_2 = .0230$ | | |
| $L_3$ | $*R_5 = +4.10036$ | $T_3 = .3240$ | | 1.490 | 57.4 |
| | $*R_6 = -4.01434$ | | | | |
| | | | $S_3 = .8560$ | | |
| $L_4$ | $R_7 = +9.4050$ | $T_4 = .1660$ | | 1.589 | 61.3 |
| | $R_8 = +39.1650$ | | | | |
| $L_{4R}$ | $R_9 = +39.1650$ | $T_5 = .1660$ | | 1.589 | 61.3 |
| | $R_{10} = +9.4050$ | | | | |
| | | | $S_4 = .8560$ | | |
| $L_{3R}$ | $*R_{11} = -4.01434$ | $T_6 = .3240$ | | 1.490 | 57.4 |
| | $*R_{12} = +4.10036$ | | | | |
| | | | $S_5 = .0230$ | | |
| $L_{2R}$ | $R_{13} = -8.0685$ | $T_7 = .3090$ | | 1.755 | 27.6 |
| | $R_{14} = +13.3610$ | | | | |
| | | | $S_6 = 13.5345$ | | | wherein the first column lists the lens elements numerically, the second column lists the respective radii and vertex radii of the aspheric surfaces $*R_5$, $*R_6$, $*R_{11}$, and $*R_{12}$ of the elements, using the convention that convex surfaces have positive radii and concave surfaces have negative radii, the third column lists the respective thicknesses of the elements, the fourth column lists the axial spacings between adjacent elements and the film plane, and the fifth and sixth columns list respectively the refractive and dispersive indices of the optical materials of the lens system.

* * * * *